Patented Dec. 16, 1947

2,432,511

UNITED STATES PATENT OFFICE 2,432,511

STABILIZATION OF ACRYLONITRILE

Harold S. Davis, Greenwich, and Oscar F. Wiedeman, Old Greenwich, Conn., assignors to American Cyanamid Company, New York, N. Y., a corporation of Maine No Drawing. Application February 16, 1943, Serial No. 476,092

6 Claims. (Cl. 260—464)

The present invention relates to the stabilization of acrylonitrile, and more particularly to methods of preventing deterioration of acrylonitrile during periods of manufacture, storage and shipment.

In the manufacture of acrylonitrile difficulty is frequently encountered, particularly in refining and marketing the product, due to its tendency to deteriorate and form solid materials when heated to a distilling temperature or when permitted to stand at normal temperatures during storage and shipment.

Acrylonitrile has been known to polymerize or deteriorate and change largely into a solid in a few days at room temperature. Properties of this compound, such as acidity and color, have been known to change under normal storage conditions, and are detrimental to its value as a commodity. This potential instability of the product during storage has been without doubt one of the major obstacles met in the development of its manufacture to the scale where it could be shipped, for example, in drums and tank cars.

Acrylonitrile is a colorless liquid having a boiling point of 77.5° C., at 760 mm. a refractive index of 1.3915 and a density of 0.8062 at 20° C. It is used chiefly for copolymerization with other materials to form plastics, artificial rubbers, etc. When used for this purpose it is essential that the product be pure and, in particular, that it be free from substances which prevent successful copolymerization.

The principal object of this invention resides in a method of stabilizing acrylonitrile against deterioration. Another important object is to provide suitable agents for inhibiting the polymerization of acrylonitrile during periods of manufacture, storage and shipment. Other objects will appear hereinafter.

It has been discovered that acrylonitrile may be effectively stabilized against deterioration in manufacture, storage and shipment by adding thereto or producing therein substances from the group consisting of ammonia, ammonium carbonate and products resulting from the reaction of ammonia with acrylonitrile, the latter comprising mainly the cyanoethylamines.

The ammonia may be added either as a gas or in aqueous solution.

Acrylonitrile may be effectively stabilized by filtration through a tower containing crystalline ammonium carbonate.

Among the products resulting from the reaction of ammonia with acrylonitrile, the 2-cyanoethylamine is particularly suitable as a stabilizing agent for acrylonitrile.

Although stabilization may be secured by the presence of only traces of the new stabilization agents, it is preferable under ordinary conditions of storage to employ between 0.01% and 0.1% of the stabilizer.

Acrylonitrile, produced by the dehydration of ethylene cyanohydrin in the presence of an alkaline catalyst, is a remarkably stable product which can be stored for extended periods in iron tanks and drums. It remains stable when shipped in tank cars, and can be used without further processing in many industries, for example, in the manufacture of artificial rubber. Ammonia, ammonium carbonate and products resulting from the reaction of ammonia with acrylonitrile are present during the above dehydrating procedure; and as a result, traces of these substances remain in the refined acrylonitrile from such processes; and prevent deterioration during storage. Treatment of the refined product with a relatively non-volatile acid or an acid salt, such as, for example, phosphoric acid or sodium acid sulfate, followed by fractional distillation, produces fractions which are substantially free from the inhibitors and decidedly unstable in storage.

In conjunction with storage tests to investigate the stability of acrylonitrile and to discover agents which inhibit deterioration of the product, the oxygen bomb induction period method (A. S. T. M. D525–39T), commonly employed in the petroleum industry for testing the stability of gasolines, has been utilized.

In the oxygen bomb test, as used in accordance with the present invention, an open glass container holding 25 cc. of acrylonitrile is placed in a stainless steel bomb fitted to a pressure recording device. Oxygen is slowly added until a pressure of 100 pounds per square inch is recorded. The bomb is then heated in a steam bath, and after thermal equilibrium is reached (15–20 minutes) the pressure remains steady for the "induction period," e. g., the period of stability, which is chosen as the time elapsed before the oxygen pressure decreases at a rate greater than 2 pounds per 15 minute interval. Therefore, the more stable the acrylonitrile is, the longer the induction period. When the absorption of oxygen is allowed to continue beyond the induction period, a point is finally reached where a violent reaction ensues, causing a sudden increase in pressure, due to the heat evolved and indicating rapid polymerization of the acrylonitrile.

The oxygen bomb test is a valuable index of the stability of acrylonitrile, in that it greatly intensifies the deterioration which takes place in ordinary storage and indicates the relative period over which the product can be stored without deterioration. Furthermore, the bomb test shows characteristics of deterioration similar to those of unstable acrylonitrile in actual storage, such as color, suspended matter, traces of acidity, and the presence of aldehydes and/or hydrocyanic acid.

Acrylonitrile is a commodity which must conform to the following specifications:

ple immediately after removal from the bomb. In the table, + means that the sample conformed to the specifications given above; — means that the sample did not pass.

Table II

| Acrylonitrile | Hours in Oxygen Bomb | Polymer | Acid | Aldehyde | HCN | Color |
|---|---|---|---|---|---|---|
| A | none | + | + | + | + | + |
| A | 16 | + | + | + | + | + |
| B | none | + | + | + | + | + |
| B | 0.6 | — | — | — | — | — |
| C | none | + | + | + | + | + |
| C | 16 | + | + | + | + | + |
| Ammonia gas added to B (NH₃ content, 0.036%) | none | + | + | + | + | + |
| Ammonia gas added to B (NH₃ content, 0.036%) tested at once | 5 | — | — | — | — | — |
| Ammonia gas added to B (NH₃ content, 0.036%) tested after 3 weeks storage ¹ | 16 | + | + | + | + | + |
| Aqueous ammonia added to B (NH₃ content, 0.1%) | none | + | + | + | + | + |
| Aqueous ammonia added to B (NH₃ content, 0.1%) tested at once | 3 | — | — | — | — | — |
| Aqueous ammonia added to B (NH₃ content, 0.1%) tested after 4 months storage | 4 | + | + | + | + | + |
| Aqueous ammonia added to B (NH₃ content, 0.036%) | none | + | + | + | + | + |
| Aqueous ammonia added to B (NH₃ content, 0.036%) tested after 24 hours storage | 4 | + | + | + | + | + |
| 2-cyanoethylamine added to B (amine content, 0.1%) | none | + | + | + | + | + |
| 2-cyanoethylamine added to B (amine content, 0.1%) tested at once | 16 | + | + | + | + | + |
| 2-cyanoethylamine added to B (amine content, 0.1%) tested after 1.5 months of storage | 16 | + | + | + | + | + |

¹ Ammonia content had decreased to 0.015%.

1. Appearance, colorless liquid.
2. Free from suspended matter (e. g., polymer).
3. Acidity, less than 0.02%, expressed as acetic acid.
4. Aldehyde, less than 0.01%, expressed as acetaldehyde.
5. Free from hydrocyanic acid.

The stability tests presented in the following tables were carried out in accordance with the above specifications. The symbols A—E used in the tables carry the following meanings:

A. Acrylonitrile produced by the dehydration of ethylene cyanohydrin in the presence of an alkaline catalyst, and, therefore, containing inhibitors, e. g., ammonia, ammonium carbonate and products resulting from the reaction of ammonia with acrylonitrile.

B. Acrylonitrile which was obtained by acid treatment of sample A followed by fractional distillation, and which was substantially free of the inhibitors.

C. Sample B filtered through ammonium carbonate.

D. Acrylonitrile produced by the reaction of hydrocyanic acid with acetylene in the presence of a catalyst.

E. Sample D filtered through ammonium carbonate.

Table I

| Acrylonitrile | Oxygen Bomb Induction Period, Hours | Condition after storage for one year at room temperature, Formation of— | | |
|---|---|---|---|---|
| | | HCN | Polymer | Color |
| A | ¹ 16 | No | No | No |
| B | 0.5 | Yes | Yes | Yes |
| C | ¹ 16 | No | No | No |
| D | 0.2 | Yes | Yes | Yes |
| E | ¹ 16 | No | No | No |

¹ No pressure drop had occurred at the end of 16 hours and the sample was removed at that time.

In testing the effectiveness of the inhibitors, their ability to increase the oxygen bomb induction period of a sample of unstable acrylonitrile has not been relied upon as much as their power to prevent deterioration in the sample when exposed for various periods to the test. Table II gives data obtained upon examination of the sam- The effectiveness of ammonium carbonate as a stabilizer is extraordinary, particularly since it is substantially insoluble in acrylonitrile. Although the procedure has been to pass the acrylonitrile through a bed of ammonium carbonate, other modes of applying the stabilizing agent may be employed.

The action of ammonia is especially worthy of note as shown by tests in Table II. If the acrylonitrile containing ammonia is allowed to age, it becomes very stable and the ammonia content decreases. Undoubtedly, reaction products of acrylonitrile and ammonia are formed, such as, for example, the cyanoethylamines. The test in Table II using 2-cyanoethylamine shows that the compound immediately inhibits deterioration.

Acrylonitrile stabilized according to this invention can be stored for extended periods, shipped in drums and tank cars and utilized as such by the consumer.

While the invention has been described with particular reference to specific embodiments, it is to be understood that it is not to be limited thereto, but is to be construed broadly and restricted solely by the scope of the appended claims.

What is claimed is:

1. Acrylonitrile stabilized with a substance chosen from the group consisting of ammonia, ammonium carbonate and a cyanoethylamine.

2. A method of stabilizing acrylonitrile which includes the step of storing the same in the presence of a substance chosen from the group consisting of ammonia, ammonium carbonate and a cyanoethylamine.

3. A method of stabilizing acrylonitrile which includes the step of producing therein a substance chosen from the group consisting of ammonia, ammonium carbonate and a cyanoethylamine.

4. A method of inhibiting deterioration of acrylonitrile which includes the step of adding thereto a substance chosen from the group consisting of ammonia, ammonium carbonate and a cyanoethylamine.

5. A method of inhibiting deterioration of acrylonitrile which includes the step of adding from 0.01% to 0.1% of a substance chosen from the group consisting of ammonia, ammonium carbonate and a cyanoethylamine.

6. A method of stabilizing acrylonitrile which includes the step of filtering acrylonitrile through ammonium carbonate.

HAROLD S. DAVIS.
OSCAR F. WIEDEMAN.

REFERENCES CITED

The following references are of record in the file of this patent:

UNITED STATES PATENTS

| Number | Name | Date |
|---|---|---|
| 2,263,436 | Britton et al. | Nov. 18, 1941 |
| 2,208,328 | Lichty | July 16, 1940 |
| 2,150,154 | Cope | Mar. 14, 1939 |
| 2,125,685 | Nicodemus | Aug. 2, 1938 |
| 2,298,739 | Lichty et al. | Oct. 13, 1942 |
| 2,301,131 | Lichty | Nov. 3, 1942 |
| 1,992,615 | Hoffman et al. | Feb. 26, 1935 |
| 2,361,367 | Davis | Oct. 31, 1944 |

FOREIGN PATENTS

| Number | Country | Date |
|---|---|---|
| 452,285 | Great Britain | Aug. 19, 1936 |